United States Patent [19]

Arline et al.

[11] Patent Number: 5,116,362
[45] Date of Patent: May 26, 1992

[54] FUEL METERING AND ACTUATION SYSTEM

[75] Inventors: Samuel B. Arline, Lake Park; Matthias Eder; Jeffrey J. Dunlap, both of Stuart; Gary W. Douglas, Palm Beach Gardens, all of Fla.

[73] Assignee: United Technologies Corporation, Hartford, Conn.

[21] Appl. No.: 621,684

[22] Filed: Dec. 3, 1990

[51] Int. Cl.⁵ .............................. F02C 7/236
[52] U.S. Cl. ...................... 60/734; 417/203
[58] Field of Search .............. 60/39.33, 734, 736, 60/261; 417/201, 202, 203, 205

[56] References Cited

U.S. PATENT DOCUMENTS

| | | | |
|---|---|---|---|
| 2,782,595 | 2/1957 | Pauly | 60/39.28 |
| 2,916,875 | 12/1959 | Morley et al. | 60/39.28 |
| 3,026,929 | 3/1962 | Burns | 417/203 |
| 3,442,218 | 5/1969 | Wess | 103/10 |
| 4,104,873 | 8/1978 | Coffinberry | 60/736 |
| 4,205,945 | 6/1980 | Davis | 417/202 |
| 4,607,486 | 8/1986 | Cole | 60/734 |
| 4,864,815 | 9/1989 | Cygnon | 60/734 |

*Primary Examiner*—Louis J. Casaregola
*Attorney, Agent, or Firm*—Edward L. Kochey, Jr.

[57] ABSTRACT

A fuel metering and actuation system includes a main centrifugal pump 16 supplying fuel to the combustor 18. Gear pump 50 takes suction from the main pump discharge and supplies actuators 42, 44, 45, 46 at high pressure. Variable set point pressure relief valve 56 operates to decrease the gear pump pressure level when high pressure is not required. Selection valve 21 directs discharge from the gear pump 50 to the combustor 18 when the main pump 16 supplied insufficient pressure for the fuel nozzles. Bypass line 30 around the selector valve with check valve 82 permits main pump 16 discharge fuel to be used for the actuator if the gear pump 50 becomes inoperative.

11 Claims, 4 Drawing Sheets

FUEL METERING AND ACTUATION SYSTEM

The Government has rights in this invention pursuant to a contract awarded by the Department of the Air Force.

DESCRIPTION

1. Technical Field

The invention relates to gas turbine engines in aircraft and in particular to a fuel system which both meters flow to the combustor and drives actuators.

2. Background of the Invention

In gas turbine engines for aircraft it is known to use the fuel not only for combustion, but also as the fluid for operating various actuators. Pumps required to obtain the necessary pressure have been either centrifugal or positive displacement pumps such as gear pumps. These pumps are normally geared to the turbine and therefore rotate at a speed which is a function of the speed of engine rotation.

Centrifugal pumps are light and small for a given flow and are substantially self regulating. They are reliable with little metal-to-metal contact and therefore relatively little wear. Disadvantages of such pumps include their inability to draw suction in the presence of air or vapor and the fact they cannot supply a high head at low rotational speeds.

Gear pumps are sufficiently tight that they can draw suction even in the presence of air or vapor. They can produce high heads at very low flows. They must however be regulated by pressure regulating valves. They are relatively large and because of the rubbing contact of the gears tend to produce more wear.

Aircraft fuel systems will normally use a boost pump taking fuel from the fuel tank with this pump having a low NPSH requirement. The boost pump supplies the fuel under moderate pressure to the main centrifugal pump thereby avoiding NPSH problems there. Either a series or parallel gear pump has been used to supply actuation pressure and flow. Such a gear pump has been sized for the maximum flow and operated at the maximum required head.

Heat not only from the engine but also from electronic equipment on the aircraft must be removed. One way known to do this is to discharge the heat through a heat exchanger into the fuel being burned. Heat removal in such a system can be critical at conditions with low flow to the combustor at the same time there is high heat loading.

The gear pump set to hold the maximum required pressure is actually providing excess pressure at those conditions which do not require the high pressure. The pump therefore uses more power than would otherwise be necessary and this excess power results in additional heating of the fuel. This is a particular problem in the upper left quadrant of the flight envelope where an aircraft is flying at low Mach numbers and high altitudes. Here the heat loading is rather high while the fuel consumption is low.

Since either the main centrifugal pump or the gear pump is subject to failure it would be advantageous to be able to operate and control a gas turbine engine with either the centrifugal or gear pump failed.

SUMMARY OF THE INVENTION

It is an object of the invention to reduce the power requirements and heating caused by a gear pump being operated to supply fuel to actuators.

It is a further object to continue operating the gas turbine engine, but with reduced rating, upon failure of either the centrifugal main fuel pump or the series located actuator gear pump.

A centrifugal boost pump supplies fuel to a centrifugal main fuel pump. From the main fuel pump fuel is supplied directly to the combustor.

A gear pump takes suction from the discharge of the main fuel pump for supplying fuel to the various actuators. A variable set point pressure relief valve maintains the discharge pressure of the gear pump at the level necessary for operation at the particular condition. Fuel pressure at the gear pump discharge is maintained at high level only when this high pressure is required to operate the actuators.

A selector valve may take flow either directly from the main fuel pump or from the gear pump for supply to the combustor. Supply is taken from the gear pump during start-up when the centrifugal pump cannot supply sufficient pressure. It is also taken from the gear pump in the event of a failed main pump.

A bypass line from the centrifugal pump discharge line to the actuator line contains a check valve and is operable for supplying reduced pressure to the actuators in the event of a failure of the gear pump.

DESCRIPTION OF PREFERRED EMBODIMENT

Figure 1:
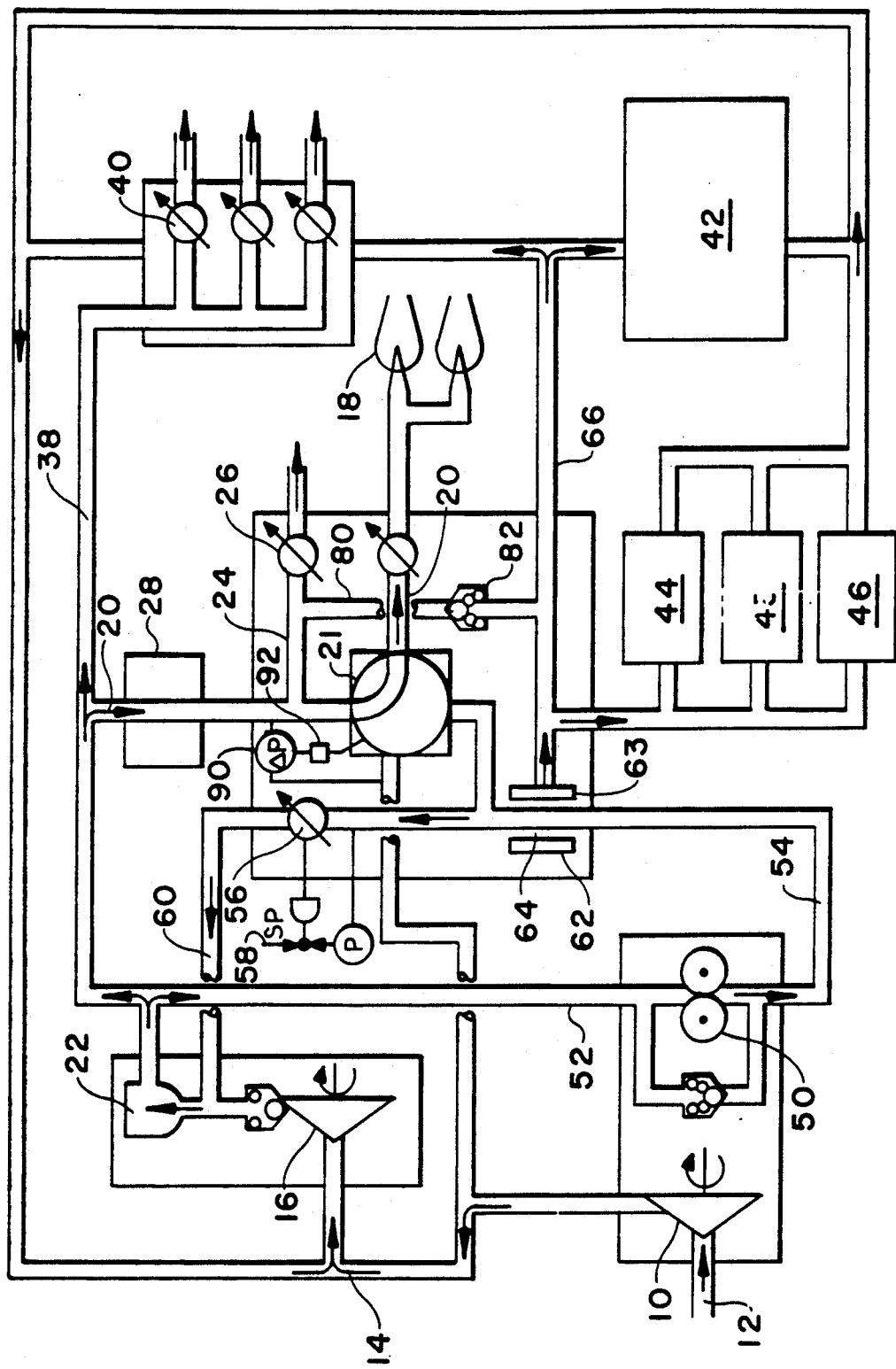
FIG. 1 is a schematic diagram of the system during normal operation.

Centrifugal boost pump 10 draws fuel through conduit 12 from fuel tank (not shown). The fuel is discharged into suction line 14 of the centrifugal main fuel pump 16.

The fuel is routed to combustor 18 through discharge line 20 which is free of any additional pumps. Located within this discharge line is a main fuel filter 22. The circulating flow line 24 takes flow from the discharge line and passes it through recirculating flow control valve 26 for recirculation to the fuel tank. Valve 26 is modulated to control this flow in order to limit the maximum fuel temperature.

A heat exchanger in the form of fuel/oil cooler 28 is located in the discharge line at a location where the recirculating flow also passes through this cooler. This cooler removes heat from the engine oil system by passing it to the lower temperature fuel which is being burned in the combustor, and also to recirculating flow when there is recirculation.

Also taken from the discharge line 20 is an afterburner supply line 38 which supplies fuel through the afterburners in response to operation of valve 40. This flow is taken from the discharge line at a point upstream of the fuel oil cooler to avoid the resistance to flow in passing through the fuel oil cooler during afterburner operation.

Actuator system 42 drives the convergent and divergent nozzles for changing the nozzle configuration in flight. Actuators 44, 45 and 46 move the fan vanes, the compressor vanes and the anti-ice valves, respectively. Other actuators operate the afterburner control valves, the main fuel throttle valve and the recirculating valve. The pressure required for these various actuators will vary depending on the flight conditions. While this is discussed later in more detail there are conditions where a pressure in the order of 3000 Psi is required for actuation. On the other hand the maximum fuel pressure required for the combustor flow is in the order of 1500 Psi. Accordingly, provisions in the form of a gear pump 50 are made to supply additional pressure.

This gear pump 50 takes suction through gear pump supply line 52 connected to the main fuel pump discharge line 20. Increased pressure is thereby obtained in gear pump exit line 54. The pressure level in the exit line is controlled by pressure relief valve 56 which operates with a variable set point of 58 established by the electronic engine control. This set point is varied as a function of the aircraft operation thereby avoiding the maintenance of extremely high pressures at times when these are not needed and accordingly avoiding the concomitant heating, energy loss and wear.

The pressure relief discharge line 60 is connected to the discharge line 20 at a location upstream of filter 22. Accordingly, the flow passing through the gear pump and being recirculated is repeatedly filtered. Any particles released by the rubbing within the gear pump are filtered out of the recirculated flow at least.

Wash filter 62 is of the type having a filter mesh 63 through which the fuel to be filtered passes and a through flow section 64 which washes the initial surface of the mesh. This filter is located in line 54 and the recirculated flow operates as a through flow washing off filtered out particles returning them to the main filter 22. The exit line 54 continues as actuator supply line 66 conveying the high pressure fluid to the various actuators.

Figure 2:
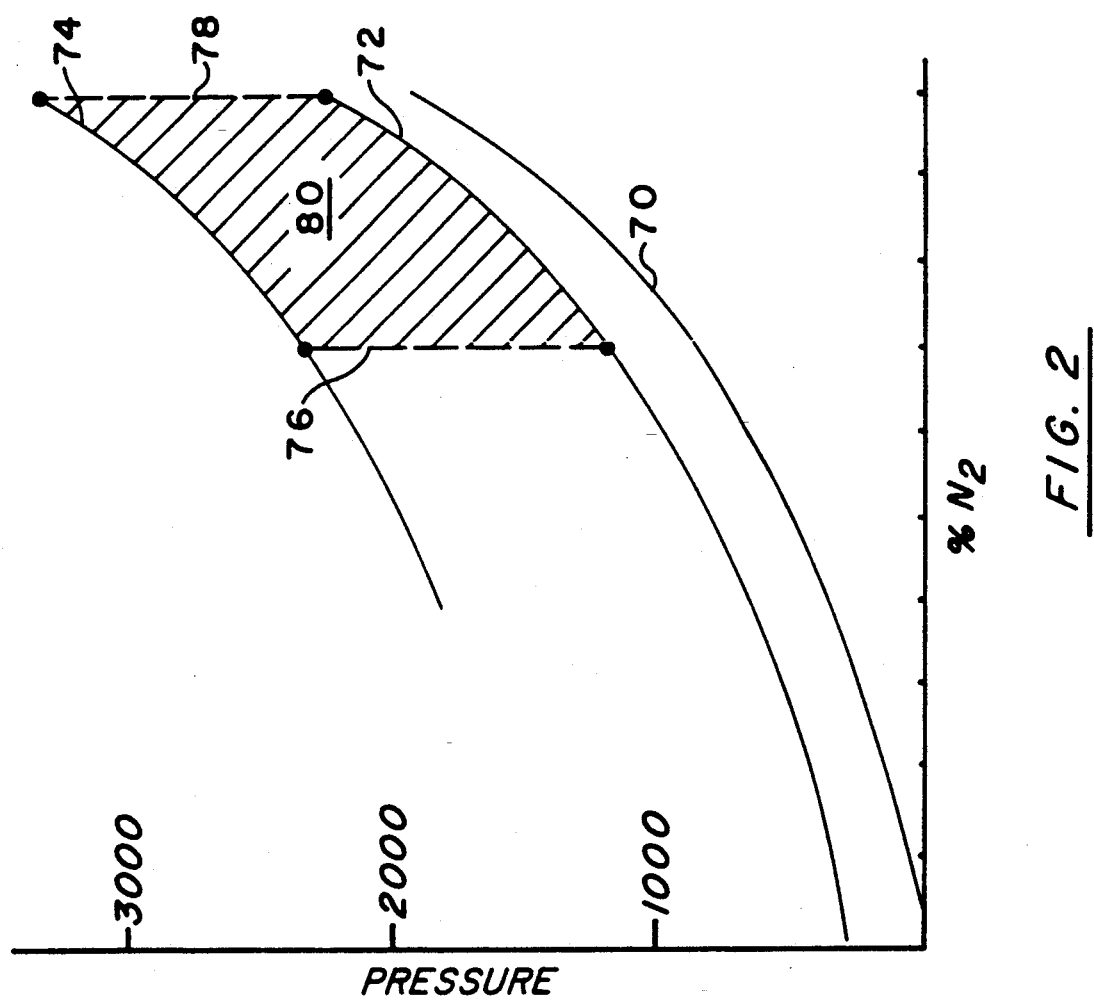
FIG. 2 is a curve showing the set point range for actuator pressure.

Referring to FIG. 2, both the centrifugal pumps 10 and 16 are directly connected to the high compressor rotor of the gas turbine engine as is gear pump 50. Pressure curve 70 represents the discharge pressure from the main fuel pump 16 as a function of the engine speed. Curve 72 is a curve located 300 Psi above curve 70. This is the minimum pressure increase which should be controlled across the gear pump for the purpose of supplying enough back pressure to the gear pump to facilitate its long-term performance without vibration and additional wear.

Curve 74 is a curve 1500 Psi above curve 70 representing the maximum desirable pressure at the exit of the gear pump. Between curves 72 and 74 representing 300 and 1500 Psi above the main pump discharge and also between rotational speed 76 and 78 representing idle and maximum speed, is a cross-hatched area 80. Discharge pressure in line 54 controlled by set point 58 is to be controlled within this area during normal operation.

The establishment of the particular set point for the actuator fuel supply pressure is a function of desired actuator performance and a number of operating variables depending on a design. Among these variables is N2 or the rotational speed of the gas turbine engine. Engine pressure ratio, pressure level within the gas turbine, desired response time of the actuator are other variables. Extremely important is the combination of altitude and Mach number at the particular time. Operation in the lower right hand quadrant of the flight envelope is operation at high Mach number and low altitude. During such operation it is known that high forces are required to operate the various components. On the other hand in the upper left hand quadrant operating at high altitude and low Mach number relatively low forces are required.

The high pressure required at low altitude and high Mach number accompanies a relatively high fuel consumption during that operation. Accordingly, the heat loading caused by maintaining a high pressure can easily be put into the fuel being burned. On the other hand in the upper left hand quadrant with low Mach number and high altitude very little fuel is being burned. With this invention the reduced pressure of operation at that time not only saves energy but the heating of the fuel is reduced at such a time where the heat cannot easily be dissipated.

Figure 3:
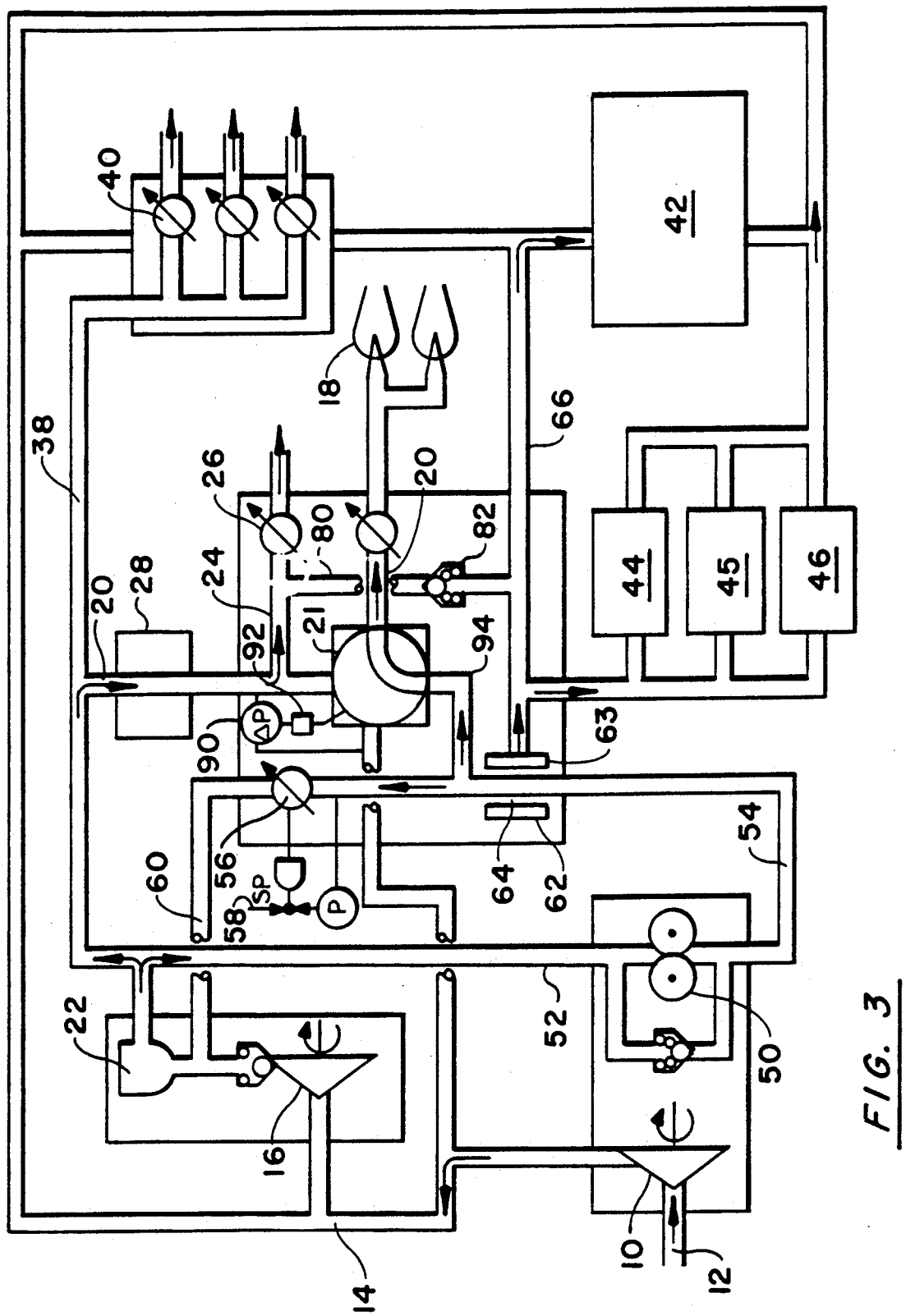
FIG. 3 is a schematic diagram of the system during startup and during failed main fuel pump operation.

FIG. 3 illustrates a schematic similar to FIG. 1 except that select valve 21 is in a different position, and some of the flow path is varied. This represents the operation of the engine during normal start of the engine below idle speed and also the operation in the event of a failed main fuel pump.

During start-up, centrifugal pump 16 is being rotated at a relatively low rate of speed with the engine and accordingly, cannot supply a pressure level satisfactory for appropriate atomization of the fuel passing to the combustor. Fuel selector valve 21 is moved to take flow from the discharge of gear pump 50 and directed to the combustor 18. Set point 58 is increased at this time so that sufficient pressure level is achieved for the combustor operation. Pressure differential sensor 90 senses the pressure difference between the discharge of centrifugal pump 16 and the suction of that pump. Actuator 92 responsive to this pressure differential operates the select valve 21. When the pressure increase in centrifugal pump 16 is less then 300 Psi it is assumed that the pump is operating at insufficient speed or failed. Actuator 92 then changes the select valve 21 to take flow from exit line 54 through alternate supply line 94. When this pressure level is exceeded the select valve returns to the normal operating position.

Accordingly, during start-up operation, gear pump 50 operates to draw fuel through the centrifugal pumps. Any air present or flashed vapor which would otherwise cause vapor lock of the centrifugal pumps is drawn through the system. It also supplies sufficient pressure for start-up operation of the combustor.

During normal operation should main pump 16 fail, the engine may still be operated by using gear pump 50 for supply of the combustor. This operation would be limited to non-afterburning power. Pump 16 is designed for supplying in the order of 320 gpm of which 70 gpm is allocated to the actuation pump for actuator supply during normal conditions. Accordingly, the gear pump is substantially limited to supplying this 70 gpm, which is sufficient for main combustor operation during main pump 16 failure.

Figure 4:
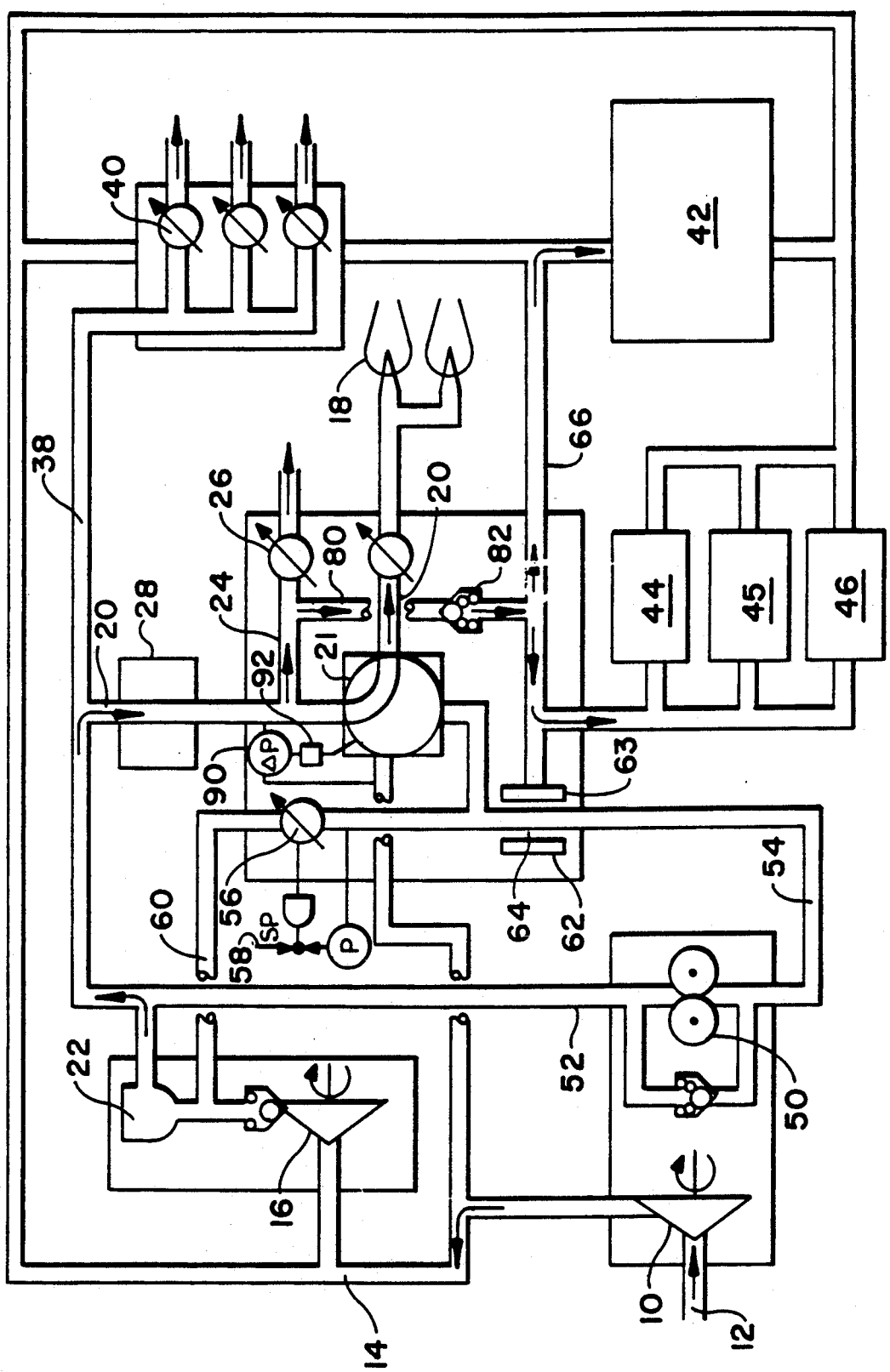
FIG. 4 is a schematic diagram of the system during failed gear pump operation.

In the event of failure of the gear pump operation is as described in FIG. 4. Since the gear pump is assumed to have failed and is probably jammed, no flow of any magnitude can be passed through the pump. Accordingly, bypass line 80 with check valve 82 effectively bypasses flow around the gear pump. It is noted that this also bypasses the flow around the wash filter 62 since particles from the defective gear pump may be blocking filter 62.

In summary, this arrangement gear pump 50 will draw suction for the centrifugal main pump 16, supply high pressure for the actuator, and selectively supply fuel to the combustor if the main pump is supplying insufficient pressure. Variable discharge pressure control for the gear pump decreases power consumption and pump wear. In the event of a gear pump 50 failure, bypass 80 with check valve 82, allows the main pump discharge to be used to operate the actuator.

A reliable pumping system with back up pumping capability is achieved. Power consumption is reduced. Excessive heating of the fuel is avoided, particularly in the critical upper left quadrant of the flight envelope.

We claim:

1. A fuel metering and actuation system for a gas turbine engine aircraft having a fuel tank comprising:
   a centrifugal boost fuel pump;
   a centrifugal main fuel pump; a combustor;
   a suction line from the discharge of said boost pump to the suction of said main pump;
   a discharge line free of additional pumps from the discharge of said main pump to said combustor;
   a plurality of actuators;
   a gear pump;
   a gear pump supply line from said discharge line to said gear pump;
   a gear pump exit line from said gear pump to said plurality of actuators;
   a pressure relief line from said exit line;
   a selector valve located in said discharge line downstream of said gear pump supply line connection;
   an alternate supply line from said exit line to said selector valve; and
   said selector valve in said discharge line connected to alternatively receive flow from said main pump or said gear pump, and in fluid communication with said combustor.

2. A fuel metering and actuation system as in claim 1:
   said pressure relief line including a pressure relief valve having an adjustable pressure set point; and
   means for adjusting said set point pressure as a function of flight conditions.

3. A fuel metering and actuation system as in claim 2:
   a filter located in said discharge line; and
   said gear pump supply line connected to said discharge line at a location downstream of said filter.

4. A fuel metering and actuation system as in claim 3:
   said pressure relief line from said pressure relief valve connected to a location upstream of said filter.

5. A fuel metering and actuation system as in claim 3:
   a wash filter in said exit line having a flowpath through the filter mesh for entrapping particles, and a flowpath along said filter mesh washing away filter particles; said exit line connected to pass flow to said actuators through said filter mesh; and
   said pressure relief line connected to carry flow across said filter to said pressure relief valve.

6. A fuel metering and actuation system as in claim 3:
   a bypass, line from said discharge line to said exit line; and
   a check valve located in said bypass line permitting flow only in the direction from said discharge line to said exit line.

7. A fuel metering and actuation system as in claim 6:
   said bypass line connected to said exit line at a location between said wash filter and said plurality of actuators, whereby flow passing through said bypass line need not pass through said wash filter en route to said actuators.

8. A fuel metering and actuation system as in claim 6:
   a heat exchanger located in said discharge line for accepting heat for cooling of other components; and
   a recirculating line downstream of said heat exchanger for returning fuel to the fuel tank.

9. A fuel metering and actuation system as in claim 8:
   an afterburner; and
   an afterburner supply line taking flow from said discharge line at a location upstream of said heat exchanger 10. A fuel metering and actuation system as in claim 1:
    a wash filter in said exit line having a flowpath through the filter mesh for entrapping particles, and a flowpath along said filter mesh washing away filter particles; said exit line connected to pass flow to said actuators through said filter mesh; and
    said pressure relief line connected to carry flow across said filter to said pressure relief valve.

11. A fuel metering and actuation system as in claim 1:
    a bypass line from said discharge line to said exit line; and
    a check valve located in said bypass line permitting flow only in the direction from said discharge line to said exit line.

* * * * *

UNITED STATES PATENT AND TRADEMARK OFFICE
CERTIFICATE OF CORRECTION

PATENT NO. : 5,116,362
DATED : May 26, 1992
INVENTOR(S) : Samuel B. Arline, Matthias Eder, Jeffrey J. Dunlap
Gary W. Douglas It is certified that error appears in the above-indentified patent and that said Letters Patent is hereby corrected as shown below:

Title page, Item [75], Inventors: "Gary W. Douglas" deleted and -- Gary W. Douglass -- should be inserted.

Signed and Sealed this

Tenth Day of August, 1993

Attest:

MICHAEL K. KIRK

Attesting Officer

Acting Commissioner of Patents and Trademarks